United States Patent
Fischer et al.

(10) Patent No.: US 11,526,009 B2
(45) Date of Patent: Dec. 13, 2022

(54) PROJECTION ARRANGEMENT FOR A HEAD-UP DISPLAY (HUD) WITH P-POLARISED LIGHT PORTIONS

(71) Applicant: SAINT-GOBAIN GLASS FRANCE, Courbevoie (FR)

(72) Inventors: Klaus Fischer, Alsdorf (DE); Dagmar Schaefer, Herzogenrath (DE); Roberto Zimmermann, Solingen (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 323 days.

(21) Appl. No.: 16/957,291

(22) PCT Filed: Feb. 4, 2019

(86) PCT No.: PCT/EP2019/052574
§ 371 (c)(1),
(2) Date: Jun. 23, 2020

(87) PCT Pub. No.: WO2019/179683
PCT Pub. Date: Sep. 26, 2019

(65) Prior Publication Data
US 2020/0400945 A1     Dec. 24, 2020

(30) Foreign Application Priority Data
Mar. 22, 2018    (EP) ..................... 18163269

(51) Int. Cl.
*G02B 27/01*      (2006.01)
*G02B 1/116*      (2015.01)
(Continued)

(52) U.S. Cl.
CPC .... *G02B 27/0101* (2013.01); *B32B 17/10229* (2013.01); *B32B 17/10458* (2013.01);
(Continued)

(58) Field of Classification Search
CPC .. G02B 27/0101; G02B 1/116; G02B 5/0875; G02B 5/3041; G02B 5/3066;
(Continued)

(56) References Cited

U.S. PATENT DOCUMENTS 6,259,559 B1 *   7/2001   Kobayashi ............... G02B 5/30
                                                                359/485.02
8,488,246 B2     7/2013   Border et al.
(Continued)

FOREIGN PATENT DOCUMENTS

CA        3034559 A1    3/2018
CN        101356455 A    1/2009
(Continued)

OTHER PUBLICATIONS

English labgage machine translation of Takahashi et al. JP-2018017839-A (Year: 2018).*
(Continued)

*Primary Examiner* — Marin Pichler
(74) *Attorney, Agent, or Firm* — Pillsbury Winthrop Shaw Pittman LLP

(57) ABSTRACT

A projection arrangement for a head-up display, including a composite pane, including an outer pane and an inner pane, which are joined to one another via a thermoplastic intermediate layer, having an upper edge and a lower edge and an HUD region; an electrically conductive coating on the surface of the outer pane or the inner pane facing the intermediate layer or provided within the intermediate layer; and a projector that is aimed at the HUD region; wherein the light of the projector has at least one p-polarised portion and wherein the electrically conductive coating has, in the spectral range from 400 nm to 650 nm, only a single local reflection maximum for p-polarised light, with this maximum in the range from 510 nm to 550 nm.

20 Claims, 5 Drawing Sheets

Figure 1:
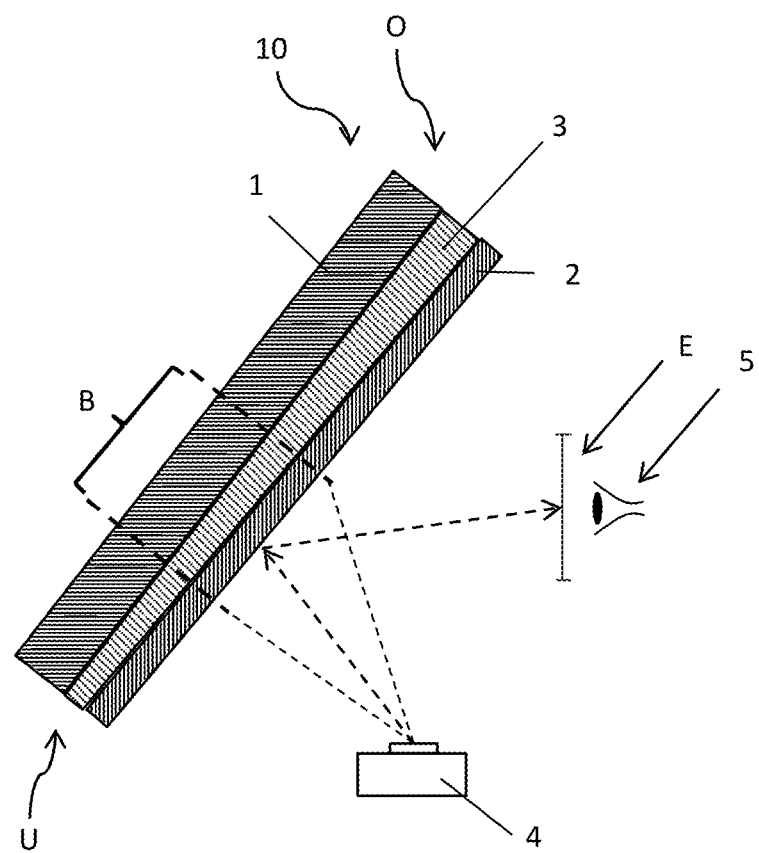

(51) Int. Cl.
*B60K 35/00* (2006.01)
*B32B 17/10* (2006.01)
*C03C 17/36* (2006.01)
*G02B 5/30* (2006.01)
*G02B 27/28* (2006.01)
*G02B 5/08* (2006.01)

(52) U.S. Cl.
CPC ........ *B32B 17/10568* (2013.01); *B60K 35/00* (2013.01); *C03C 17/3626* (2013.01); *C03C 17/3639* (2013.01); *C03C 17/3644* (2013.01); *C03C 17/3649* (2013.01); *C03C 17/3657* (2013.01); *C03C 17/3681* (2013.01); *G02B 1/116* (2013.01); *G02B 5/0875* (2013.01); *G02B 5/3041* (2013.01); *G02B 5/3066* (2013.01); *G02B 27/283* (2013.01); *B32B 17/10036* (2013.01); *B32B 17/10761* (2013.01); *B60K 2370/1529* (2019.05); *B60K 2370/23* (2019.05); *C03C 2217/216* (2013.01); *C03C 2217/23* (2013.01); *C03C 2217/256* (2013.01); *C03C 2217/26* (2013.01); *C03C 2217/261* (2013.01); *C03C 2217/281* (2013.01); *C03C 2217/734* (2013.01); *C03C 2218/156* (2013.01); *G02B 2027/012* (2013.01); *G02B 2027/013* (2013.01); *G02B 2027/0194* (2013.01)

(58) Field of Classification Search
CPC ............ G02B 27/283; G02B 2027/012; G02B 2027/013; G02B 2027/0194; B32B 17/10229; B32B 17/10458; B32B 17/10568; B32B 17/10036; B32B 17/10761; B32B 17/1077; B32B 17/10788; B60K 35/00; B60K 2370/1529; B60K 2370/23; C03C 17/3626; C03C 17/3639; C03C 17/3644; C03C 17/3649; C03C 17/3657; C03C 17/3681; C03C 2217/216; C03C 2217/23; C03C 2217/256; C03C 2217/26; C03C 2217/261; C03C 2217/281; C03C 2217/734; C03C 2218/156; C03C 17/36

USPC .................................................. 359/485.01
See application file for complete search history.

(56) References Cited

U.S. PATENT DOCUMENTS

| | | |
|---|---|---|
| 2007/0020465 A1 | 1/2007 | Thiel et al. |
| 2007/0082219 A1 | 4/2007 | Fleury et al. |
| 2013/0302580 A1 | 11/2013 | Tomida et al. |
| 2016/0109706 A1 | 4/2016 | Schowengerdt et al. |
| 2017/0242247 A1 | 8/2017 | Tso et al. |
| 2017/0343806 A1 | 11/2017 | Anzai et al. |
| 2018/0203228 A1 | 7/2018 | Hatano |
| 2019/0202177 A1 | 7/2019 | Manz et al. |

FOREIGN PATENT DOCUMENTS

| | | |
|---|---|---|
| CN | 101400619 A | 4/2009 |
| CN | 104025704 A | 9/2014 |
| CN | 104044313 A | 9/2014 |
| CN | 104267499 A | 1/2015 |
| CN | 107771298 A | 3/2018 |
| DE | 10 2014 220 189 A1 | 4/2016 |
| DE | 20 2017 102552 U1 | 5/2017 |
| EP | 1 880 243 A2 | 1/2008 |
| EP | 1 800 855 B1 | 2/2013 |
| EP | 3 187 917 A2 | 7/2017 |
| JP | 2017-026978 A | 2/2017 |
| JP | 2017-538141 A | 12/2017 |
| JP | 2018-017839 A | 2/2018 |
| WO | WO 03/024155 A2 | 3/2003 |
| WO | WO 2006/122305 A2 | 11/2006 |
| WO | WO 2009/071135 A1 | 6/2009 |
| WO | WO 2013/104438 A1 | 7/2013 |
| WO | WO 2013/104439 A1 | 7/2013 |
| WO | WO 2016/091435 A1 | 6/2016 |
| WO | WO 2017/198363 A1 | 11/2017 |
| WO | WO 2018/041472 A1 | 3/2018 |

OTHER PUBLICATIONS

International Search Report as issued in Internationa Patent Application No. PCT/EP2019/052574, dated May 17, 2019.

* cited by examiner

PROJECTION ARRANGEMENT FOR A HEAD-UP DISPLAY (HUD) WITH P-POLARISED LIGHT PORTIONS

CROSS-REFERENCE TO RELATED APPLICATIONS

This application is the U.S. National Stage of PCT/EP2019/052574, filed Feb. 4, 2019, which in turn claims priority to European patent application number 18163269.6 filed Mar. 22, 2018. The content of these applications are incorporated herein by reference in their entireties.

The invention relates to a projection arrangement for a head-up display and the use of a composite pane in such a projection arrangement.

Modern automobiles are increasingly equipped with so-called head-up displays (HUDs). With a projector, typically, in the region of the dashboard, images are projected onto the windshield, reflected there, and perceived by the driver as a virtual image behind the windshield (from his point of view). Thus, important data can be projected into the drivers field of vision, for example, the current driving speed, navigation or warning messages, which the driver can perceive without having to divert his glance from the road. Head-up displays can thus contribute significantly to an increase in traffic safety.

With the above described head-up displays, the problem arises that the projector image is reflected on both surfaces of the windshield. Thus, the driver perceives not only the desired primary image, which is caused by the reflection on the interior-side surface of the windshield (primary reflection). The driver also perceives a slightly offset secondary image, usually weaker in intensity, which is caused by the reflection on the exterior-side surface of the windshield (secondary reflection). The latter is commonly referred to as a ghost image ("ghost"). This problem is commonly resolved in that the reflecting surfaces are arranged at an angle relative to one another deliberately selected such that the primary image and the ghost image are superimposed, as a result of which the ghost image is no longer distractingly noticeable.

Windshields comprise two glass panes that are laminated to one another via a thermoplastic film. If the surfaces of the glass panes are to be arranged at an angle as described, it is customary to use a thermoplastic film with a non-constant thickness. This is also referred to as a wedge-shaped film or a wedge film. The angle between the two surfaces of the film is referred to as a wedge angle. The wedge angle can be constant over the entire film (linear change in thickness) or change as a function of position (nonlinear change in thickness). Composite glasses with wedge films are known, for example, from WO2009/071135A1, EP1800855B1, or EP1880243A2.

It is also known to provide windshields with transparent, electrically conductive coatings. These coatings can act as IR-reflecting coatings to reduce the heating up of the vehicle interior and thus improve thermal comfort. The coatings can, however, also be used as heatable coatings by connecting them to a voltage source such that a current flows through the coating. Suitable coatings include conductive, metallic layers, for example, based on silver or aluminium. Since these coatings are susceptible to corrosion, it is customary to apply them on the surface of the outer pane or the inner pane facing the intermediate layer such that they have no contact with the atmosphere. Silver-containing transparent coatings are known, for example, from WO 03/024155, US 2007/0082219 A1, US 2007/0020465 A1, WO 2013/104438, or WO 2013/104439. In connection with head-up displays, coated windshields often have the problem that an additional reflecting boundary surface for the projector image is formed by the conductive coating. This results in another an desirable secondary image, which is also referred to as a layer ghost image or a layer ghost.

The light of the HUD projector is typically substantially s-polarised due to the better reflection characteristics of the windshield compared to p-polarisation. However, if the driver wears polarisation-selective sunglasses that transmit only p-polarised light, he can hardly perceive the HUD image, or not at all. There is, consequently, a need for HUD projection arrangements that are compatible with polarisation-selective sunglasses.

DE 10 2014 220 189 A1 discloses an HUD projection arrangement that is operated with p-polarised light to generate an HUD image that is also perceivable with polarisation-selective sunglasses. Since the angle of incidence is typically close to Brewster's angle and p-polarised light is therefore reflected only to a small extent by the glass surfaces, the windshield has a reflective structure that can reflect p-polarised light in the direction of the driver. Among other things, a single metallic layer with a thickness from 5 nm to 9 nm, for example, made of silver or aluminium is proposed as the reflective structure. Although a p-polarised HUD image can be perceived by drivers with and without polarisation-selective sunglasses, it is primarily reflected by the metallic layer, but not significantly by the glass surfaces. This limits the intensity of the HUD image.

US 2017/0242247 A1 likewise discloses an HUD projection arrangement that is operated with p-polarised light, wherein the windshield is provided with an electrically conductive coating. The electrically conductive coating has, in the spectral range from 400 nm to 650 nm, a local reflection maximum for p-polarised light, which is in the range from 510 nm to 550 nm. The proportion of p-polarised light in the total light of the HUD projector is 100%.

The object of the invention is to provide an improved projection arrangement for a head-up display, wherein the composite pane used is provided with an electrically conductive coating.

The head-up display should also be readily perceivable even for drivers with polarisation-selective sunglasses and should have high intensity.

The object of the present invention is accomplished according to the invention by a projection arrangement in accordance with claim 1. Preferred embodiments are disclosed in the dependent claims.

According to the invention, at least partially p-polarised light, preferably a mixture of s- and p-polarised light, is used for generating the HUD image. S-polarised light components are efficiently reflected by the pane surfaces. Since the angle of incidence of about 65° typical for HUD projection arrangements is relatively close to Brewster's angle for an air/glass transition (57.2°, soda lime glass), the p-polarised light components are, on the other hand, hardly reflected by the pane surfaces. However, the electrically conductive coating according to the invention is optimized for the reflection of p-polarised light. A driver with polarisation-selective sunglasses that allow only p-polarised light to pass can, consequently, perceive the HUD projection that is caused by light component reflected at the coating. A driver without such sunglasses perceives an HUD image that is caused by the superimposing of the s- and p-polarised light components, as a result of which the overall intensity is increased. The result is thus an HUD projection that can readily be perceived both by drivers with polarisation-selective sunglasses and by drivers without such sunglasses. This is the major advantage of the present invention.

The projection arrangement according to the invention for a head-up display (HUD) includes at least a composite pane with an electrically conductive coating and a projector. As is usual with HUDs, the projector irradiates a region of the windshield where the light is reflected in the direction of the viewer (driver), generating a virtual image, which the viewer perceives, from his point of view, as behind the windshield. The region of the windshield that can be irradiated by the projector is referred to as the HUD region. The beam direction of the projector can typically be varied by mirrors, in particular vertically, in order to adapt the projection to the body size of the viewer. The region in which the eyes of the viewer must be situated with a given mirror position is referred to as the "eye box window". This eye box window can be shifted vertically by adjustment of the mirrors, with the entire area thus available (i.e., the superimposing of all possible eye box windows) referred to as the "eye box". A viewer situated within the eye box can perceive the virtual image. This, of course, means that the eyes of the viewer must be situated within the eye box, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The composite pane comprises an outer pane and an inner pane that are joined to one another via a thermoplastic intermediate layer. The composite pane is intended, in a window opening, in particular the window opening of a motor vehicle, to separate the interior from the outside environment. In the context of the invention, the term "inner pane" refers to the pane of the composite pane facing the interior (vehicle interior). The term "outer pane" refers to the pane facing the outside environment. The composite pane is preferably a motor vehicle windshield (in particular the windshield of a motor vehicle, for example, of the passenger car or a truck).

The composite pane has an upper edge and a lower edge as well as two side edges extending therebetween. "Upper edge" refers to that edge that is intended to point upward in the installed position. "Lower edge" refers to that edge that is intended to point downward in the installed position. The upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the outside environment. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The composite pane has an electrically conductive coating, in particular a transparent, electrically conductive coating. The electrically conductive coating is preferably applied to one of surfaces of the two panes facing the intermediate layer, i.e., the interior-side surface of the outer pane or the exterior-side surface of the inner pane. Alternatively, the electrically conductive coating can also be arranged within the thermoplastic intermediate layer, for example, applied to a carrier film that is arranged between two thermoplastic bonding films. The conductive coating can, for example, be provided as an IR-reflecting solar protection coating or also as a heatable coating that is electrically contacted and heats up when current flows through it. The term "transparent coating" means a coating that has average transmittance in the visible spectral range of at least 70%, preferably at least 80%, which thus does not substantially restrict vision through the pane. Preferably, at least 80% of the pane surface is provided with the coating according to the invention. In particular, the coating is applied to the pane surface over its entire surface with the exception of a peripheral edge region and, optionally, a local region that are intended to ensure the transmittance of electromagnetic radiation through the composite pane as communication windows, sensor windows, or camera windows, and, consequently, are not provided with the coating. The peripheral uncoated edge region has, for example, a width of up to 20 cm. It prevents direct contact of the coating with the surrounding atmosphere such that the coating is protected, inside the composite pane, against corrosion and damage.

The electrically conductive coating is a layer stack or a layer sequence, comprising one or a plurality of electrically conductive, in particular metal-containing layers, wherein each electrically conductive layer is in each case arranged between two dielectric layers or layer sequences. The coating is thus a thin-film stack having n electrically conductive layers and (n+1) dielectric layers or layer sequences, where n is a natural number and wherein, on a lower dielectric layer or layer sequence, a conductive layer and a dielectric layer or layer sequence follows alternatingly in each case. Such coatings are known as solar protection coatings and heatable coatings, wherein the electrically conductive layers are typically based on silver.

The electrically conductive coating according to the invention is adjusted, in particular through the selection of the materials and thicknesses of the individual layers and the structure of the dielectric layer sequence, such that in the spectral range from 400 nm to 650 nm, preferably in the spectral range from 400 nm to 750 nm, only a single local reflection maximum for p-polarised light occurs. This reflection maximum for p-polarised light is, in particular, in the spectral range from 510 nm to 550 nm. In an advantageous embodiment, this local reflection maximum represents the highest reflection value in the spectral range from 400 nm to 650 nm, i.e., in the spectral range from 400 nm to 650 nm, no reflectance for p-polarised light occurs that is higher than the reflectance of the local maximum.

The inventors have discerned that such an electrically conductive coating efficiently reflects the p-polarised light components and the composite pane also has relatively neutral colouration in transmittance and reflection. With the coating adjusted according to the invention, it is, in particular, possible to freely select the p-polarised light component corresponding to the requirements of the individual case, with the colouration always remaining relatively neutral. Thus, the p-polarised light components can be selected in the individual case, as a function of the projector used, the wavelength of its light, the angle of incidence, and the geometry of the composite pane, such that an advantageous overall intensity is achieved. The invention is, consequently, flexibly applicable to various HUD systems, which constitutes a great advantage.

Decisive for the properties of the projection arrangement is the reflection behaviour of the composite pane, which is essentially determined by the electrically conductive coating. The reflection spectrum is measured on the composite pane provided with the electrically conductive coating. Strictly speaking, the reflection properties described here for p- or s-polarised light (reflectance, local reflection maximum) thus refer not to the insulated electrically conductive coating, but to the composite pane with the electrically conductive coating.

Reflectance describes the proportion of the total incident light that is reflected. It is indicated in % (based on 100% incident light) or as a unitless number from 0 to 1 (normalized to the incident light). Plotted as a function of the wavelength, it forms the reflection spectrum.

The difference between the reflectance for p-polarised light that occurs at the local reflexion maximum in the spectral range from 400 nm to 6500 nm and the reflectance for p-polarised light minimally occurring in the spectral range from 400 nm to 650 nm is, in an advantageous embodiment, at most 10%, preferably at most 8%. The reflection curve is then relatively flat, which is advantageous in terms of the most color-true representation of the projector image possible. The percentages here indicate the absolute difference in reflectance (based on 100% incident light).

The reflection spectrum for s-polarised light should also be as flat as possible, i.e., should have no pronounced maxima and minima, in particular in the spectral range from 450 nm to 600 nm. When the reflection spectra for both polarisation directions are sufficiently flat, the relative proportions of s-polarised and p-polarised light can be freely selected without this being accompanied by an undesirable colour shift. In an advantageous embodiment, the reflectance for s-polarised light in the spectral range from 450 nm to 600 nm is substantially constant. In the context of the invention, this means that the difference between the maximum reflectance occurring and the mean and the difference between the minimum reflectance occurring and the mean are at most 5%, preferably at most 3%, particularly preferably at most 1%. The percentages here indicate the absolute difference in reflectance (based on 100% incident light).

The projector is arranged on the inside of the composite pane and irradiates the composite pane via the interior-side surface of the inner pane. It is aimed at the HUD region and irradiates it to generate the HUD projection. The light of the projector has, according to the invention, a p-polarised component >0%. In principle, the p-polarised component can even be 100%; i.e., the projector can emit purely p-polarised light. For the overall intensity of the HUD, it is, however, advantageous for the light of the projector to have both s-polarised and p-polarised components. In this case, the p-polarised light components are efficiently reflected by the coating; and the s-polarised light components, by the pane surfaces. The ratio of p-polarised light components to s-polarised light components can be freely selected according to the requirements of the individual case. The proportion of p-polarised light in the total light of the projector is, for example, from 20% to 100%, preferably from 20% to 80%. In a particularly advantageous embodiment, the proportion of p-polarised light is at least 50%, i.e., from 50% to 100%, preferably from 50% to 80%, ensuring, in particular, that a driver with polarisation-selective sunglasses can perceive a high-intensity image. The indication of the polarisation direction refers to the plane of incidence of the light on the composite pane. The expression "p-polarised light" refers to light whose electric field oscillates in the plane of incidence. "S-polarised light" refers to light whose electric field oscillates perpendicular to the plane of incidence. The plane of incidence is generated by the vector of incidence and the surface normal of the composite pane in the geometric centre of the HUD region.

The light of the projector preferably strikes the composite pane with an angle of incidence from 50° to 80°, in particular from 60° to 70°, typically about 65°, as is customary with HUD projection arrangements. The angle of incidence is the angle between the vector of incidence of the projector light and the surface normal in the geometric centre of the HUD region.

The electrically conductive coating according to the invention has, in a preferred embodiment, at least two functional, electrically conductive layers, particularly preferably at least three electrically conductive layers, most particularly preferably at least four electrically conductive layers, in particular exactly four electrically conductive layers. Due to the high number of conductive layers, sufficient degrees of freedom are available for optimizing the coating in terms of transmittance and reflection behaviour and colouration.

The functional, electrically conductive layers are responsible for the electrical conductivity of the coating. By dividing the entire conductive material into multiple layers separate from one another, the layers can be designed thinner in each case, as a result of which the transparency of the coating is increased. Each electrically conductive layer preferably contains at least one metal or one metal alloy, for example, silver, aluminium, copper, or gold, and is particularly preferably based on the metal or the metal alloy, in other words, consists substantially of the metal or the metal alloy apart from any dopants or impurities. Preferably used is silver or a silver-containing alloy. In an advantageous embodiment, the electrically conductive layer contains at least 90 wt.-% silver, preferably at least 99 wt.-% silver, particularly preferably at least 99.9 wt.-% silver.

Each electrically conductive layer preferably has a layer thickness from 3 nm to 20 nm, particularly preferably from 5 nm to 15 nm. The total layer thickness of all electrically conductive layers is preferably from 20 nm to 50 nm, particularly preferably from 30 nm to 40 nm.

According to the invention, dielectric layers or layer sequences are arranged between the electrically conductive layers and below the lowest conductive layer and above the uppermost conductive layer. Each dielectric layer or layer sequence has at least one anti-reflective layer. The anti-reflective layers reduce the reflection of visible light and thus increase the transparency of the coated pane. The anti-reflective layers contain, for example, silicon nitride (SiN), mixed silicon-metal nitrides such as silicon-zirconium nitride (SiZrN), aluminium nitride (AlN), or tin oxide (SnO). The anti-reflective layers can also have dopants. The layer thickness of the individual anti-reflective layers is preferably from 10 nm to 70 nm.

The anti-reflective layers can in turn be subdivided into at least two sublayers, in particular into a dielectric layer having a refractive index smaller than 2.1 and an optically high refractive layer having a refractive index greater than or equal to 2.1. Preferably, at least one anti-reflective layer arranged between two electrically conductive layers is subdivided in this way, particularly preferably each anti-reflective layer arranged between two electrically conductive layers. The subdivision of the anti-reflective layer results in lower sheet resistance of the electrically conductive coating with, at the same time, high transmittance and high colour neutrality. The order of the two sublayers can, in principle, be selected arbitrarily, with the optically high refractive layer preferably arranged above the dielectric layer, which is particularly advantageous in terms of the sheet resistance.

The thickness of the optically high refractive layer is preferably from 10% to 99%, particularly preferably from 25% to 75% of the total thickness of the anti-reflective layer.

The optically high refractive layer having a refractive index greater than or equal to 2.1 contains, for example, MnO, $WO_3$, $Nb_2O_5$, $Bi_2O_3$, $TiO_2$, $Zr_3N_4$, and/or AlN, preferably mixed silicon-metal nitride, for example, mixed silicon-aluminium nitride, mixed silicon-hafnium nitride, or mixed silicon-titanium nitride, particularly preferably mixed silicon-zirconium nitride (SiZrN). This is particularly advantageous in terms of the sheet resistance of the electrically conductive coating. The mixed silicon-zirconium nitride preferably has dopants. The layer of an optically high refractive material can contain, for example, an aluminium-doped mixed silicon-zirconium nitride. The zirconium content is preferably between 15 and 45 wt.-%, particularly preferably between 15 and 30 wt.-%.

The dielectric layer having a refractive index lower than 2.1 preferably has a refractive index n between 1.6 and 2.1, particularly preferably between 1.9 and 2.1. The dielectric layer preferably contains at least one oxide, for example, tin oxide, and/or one nitride, particularly preferably silicon nitride.

In a preferred embodiment, each anti-reflective layer arranged between two electrically conductive layers is subdivided into a dielectric layer having a refractive index lower than 2.1 and an optically high refractive layer having a refractive index greater than or equal to 2.1. The thickness of each antireflection arranged between two electrically conductive layers is from 15 nm to 60 nm. The anti-reflective layers above the uppermost electrically conductive layer and below the lowest electrically conductive layer can also be subdivided, but are preferably implemented as individual layers and have, in each case, a thickness from 10 nm to 25 nm.

In an advantageous embodiment, one or a plurality of dielectric layer sequences has/have a first matching layer, preferably each dielectric layer sequence that is arranged below an electrically conductive layer. The first matching layer is preferably arranged above the anti-reflective layer.

In an advantageous embodiment, one or more dielectric layer sequences has/have a smoothing layer, preferably each dielectric layer sequence that is arranged between two electrically conductive layers. The smoothing layer is arranged below one of the first matching layers, preferably between the anti-reflective layer and the first matching layer. The smoothing layer preferably makes direct contact with the first matching layer. The smoothing layer is responsible for optimisation, in particular smoothing of the surface for an electrically conductive layer subsequently applied above it. An electrically conductive layer deposited on a smoother surface has higher transmittance with, at the same time, lower sheet resistance. The layer thickness of a smoothing layer is preferably from 3 nm to 20 nm, particularly preferably from 4 nm to 12 nm. The smoothing layer preferably has a refractive index of less than 2.2.

The smoothing layer preferably contains at least one non-crystalline oxide. The oxide can be amorphous or partially amorphous (and thus partially crystalline) but is not completely crystalline. The non-crystalline smoothing layer has low roughness and thus forms an advantageously smooth surface for the layers to be applied above the smoothing layer. The non-crystalline smoothing layer is further responsible for an improved surface structure of the layer deposited directly above the smoothing layer, which is preferably the first matching layer. The smoothing layer can contain, for example, at least one oxide of one or more of the elements tin, silicon, titanium, zirconium, hafnium, zinc, gallium, and indium. The smoothing layer particularly preferably contains a non-crystalline mixed oxide. The smoothing layer most particularly preferably contains a mixed tin-zinc oxide (ZnSnO). The mixed oxide can have dopants. The smoothing layer can contain, for example, an antimony-doped mixed tin-zinc oxide. The mixed oxide preferably has substoichiometric oxygen content. The tin content is preferably between 10 and 40 wt.-%, particularly preferably between 12 and 35 wt.-%.

In an advantageous embodiment, one or more dielectric layer sequences, preferably each dielectric layer sequence, has/have a second matching layer that is arranged above an electrically conductive layer. The second matching layer is preferably arranged below the anti-reflective layer.

The first and the second matching layers are responsible for an improvement of the sheet resistance of the coating. The first matching layer and/or the second matching layer preferably contains zinc oxide $ZnO1-\delta$ with $0<\delta<0.01$. The first matching layer and/or the second matching layer further preferably contains dopants. The first matching layer and/or the second matching layer can, for example, contain aluminium-doped zinc oxide (ZnO:Al). The zinc oxide is preferably deposited substoichiometrically with respect to oxygen in order to avoid a reaction of excess oxygen with the silver-containing layer. The layer thicknesses of the first matching layer and the second matching layer are preferably from 3 nm to 20 nm, particularly preferably from 4 nm to 12 nm.

In an advantageous embodiment, the electrically conductive coating includes one or more blocking layers. Preferably, at least one blocking layer is associated with at least one, particularly preferably with each electrically conductive layer. The blocking layer makes direct contact with the electrically conductive layer and is arranged immediately above or immediately below the electrically conductive layer. I.e., no other layer is arranged between the electrically conductive layer and the blocking layer. A blocking layer can also be arranged immediately above and immediately below a conductive layer in each case. The blocking layer preferably contains niobium, titanium, nickel, chromium, and/or alloys thereof, particularly preferably nickel-chromium alloys. The layer thickness of the blocking layer is preferably from 0.1 nm to 2 nm, particularly preferably from 0.1 nm to 1 nm. A blocking layer immediately below the electrically conductive layer serves in particular to stabilise the electrically conductive layer during a temperature treatment and improves the optical quality of the electrically conductive coating. A blocking layer immediately above the electrically conductive layer prevents contact of the sensitive electrically conductive layer with the oxidising reactive atmosphere during the deposition of the following layer by reactive cathodic sputtering, for example, of the second matching layer.

In the context of the invention, if a first layer is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer. In the context of the invention, if a first layer is arranged "above or below" a second layer, this does not necessarily mean that the first and the second layer are in direct contact with one another. One or more additional layers can be arranged between the first and the second layer provided this is not explicitly ruled out. The values indicated for refractive indexes are measured at a wavelength of 550 nm.

The electrically conductive coating with the reflection characteristics according to the invention is, in principle, realisable in various ways, preferably using the above-described layers such that the invention is not restricted to a specific layer sequence. In the following, a particularly preferred embodiment of the coating, with which particularly good results are achieved, in particular with a typical angle of incidence of the light of about 65°, is presented.

In the particularly preferred embodiment, the conductive coating has at least four, in particular exactly four, electrically conductive layers. Each electrically conductive layer preferably has a layer thickness from 3 nm to 20 nm, particularly preferably from 5 nm to 15 nm. The total layer thickness of all electrically conductive layers is preferably from 20 nm to 50 nm, particularly preferably from 30 nm to 40 nm.

The anti-reflective layer between the second and the third conductive layer is significantly thicker (preferably from 45 nm to 55 nm) than the anti-reflective layers between the first and second conductive layer and between the third and fourth conductive layer (preferably from 15 nm to 35 nm, with, in particular, one of the two anti-reflective layers having a thickness from 15 nm to 25 nm; and the other, a thickness from 25 nm to 35 nm). The anti-reflective layer between the first and the second electrically conductive layer particularly preferably has a thickness from 25 nm to 35 nm. The anti-reflective layer between the second and the third electrically conductive layer particularly preferably has a thickness from 45 nm to 55 nm. The anti-reflective layer between the third and the fourth electrically conductive layer particularly preferably has a thickness from 15 nm to 25 nm.

All anti-reflective layers that are arranged between two electrically conductive layers are, as described above, subdivided into a dielectric layer having a refractive index of less than 2.1 (preferably based on silicon nitride) and an optically high refractive layer having a refractive index greater than or equal to 2.1 (preferably based on a mixed silicon/metal nitride such as silicon-zirconium nitride or silicon-hafnium nitride). The optically high refractive layer preferably accounts for from 25% to 75% of the total thickness of the anti-reflective layers.

The anti-reflective layers below the lowest conductive layer and above the uppermost conductive layer are implemented as single layers with a layer thickness from 10 nm to 25 nm. Preferably, the anti-reflective layer below the lowest conductive layer based on silicon nitride is implemented with a thickness from 15 nm to 25 nm; and the anti-reflective layer above the uppermost conductive layer based on a mixed silicon/metal nitride such as silicon-zirconium nitride or silicon-hafnium nitride, with a thickness from 8 nm to 18 nm.

The particularly preferred embodiment of the coating also contains matching layers and smoothing layers, as well as optional blocking layers, as described above.

A most particularly preferred embodiment of the electrically conductive coating contains or consists of the following layer sequence starting from the substrate:
an anti-reflective layer based on silicon nitride with a thickness from 20 nm to 23 nm,
a first matching layer based on zinc oxide with a thickness from 8 nm to 12 nm,
an electrically conductive layer based on silver with a thickness from 8 nm to 11 nm,
optionally, a blocking layer based on NiCr with a thickness from 0.1 nm to 0.5 nm,
a second matching layer based on zinc oxide with a thickness from 8 nm to 12 nm,
an anti-reflective layer with a thickness from 28 nm to 32 nm, preferably subdivided into a dielectric layer based on silicon nitride with a thickness from 14 nm to 17 nm and an optically high refractive layer based on a mixed silicon/metal nitride such as silicon-zirconium nitride or silicon-hafnium nitride with a thickness from 14 nm to 17 nm,
a smoothing layer based on mixed tin-zinc oxide with a thickness from 5 nm to 9 nm,
a first matching layer based on zinc oxide with a thickness from 8 nm to 12 nm,
an electrically conductive layer based on silver with a thickness from 11 nm to 14 nm,
optionally, a blocking layer based on NiCr with a thickness from 0.1 nm to 0.5 nm,
a second matching layer based on oxide with a thickness from 8 nm to 12 nm,
an anti-reflective layer with a thickness from 48 nm to 52 nm, preferably subdivided into a dielectric layer based on silicon nitride with a thickness from 33 nm to 37 nm and an optically high refractive layer based on a mixed silicon/metal nitride such as silicon-zirconium nitride or silicon-hafnium nitride with a thickness from 14 nm to 17 nm,
eine smoothing layer based on mixed tin-zinc oxide with a thickness from 5 nm to 9 nm,
eine first matching layer based on zinc oxide with a thickness from 8 nm to 12 nm,
an electrically conductive layer based on silver with a thickness from 8 nm to 11 nm,
optionally, a blocking layer based on NiCr with a thickness from 0.1 nm to 0.5 nm,
a second matching layer based on zinc oxide with a thickness from 8 nm to 12 nm,
an anti-reflective layer with a thickness from 18 nm to 22 nm, preferably subdivided into a dielectric layer based on silicon nitride with a thickness from 4 nm to 7 nm and an optically high refractive layer based on a mixed silicon/metal nitride such as silicon-zirconium nitride or silicon-hafnium nitride with a thickness from 14 nm to 17 nm,
a smoothing layer based on mixed tin-zinc oxide with a thickness from 5 nm to 9 nm,
a first matching layer based on zinc oxide with a thickness from 8 nm to 12 nm,
an electrically conductive layer based on silver with a thickness from 4 nm to 7 nm,
optionally, a blocking layer based on NiCr with a thickness from 0.1 nm to 0. nm,
a second matching layer based on zinc oxide with a thickness from 8 nm to 12 nm,
an anti-reflective layer based on a mixed silicon/metal nitride such as silicon-zirconium nitride or silicon-hafnium nitride with a thickness from 11 nm to 15 nm, When a layer is based on a material, the layer consists for the most part of this material in addition to any impurities or dopants.

As with other generic projection arrangements, unwanted secondary images (so-called "ghost images"), which are in particular perceived by drivers without polarisation-selective sunglasses, can occur. The s-polarised light components are first reflected at the interior-side surface of the interpane facing away from the intermediate layer. The non-reflected partial beam passes through the composite pane and is reflected again at the exterior-side surface of the outer pane facing away from the intermediate layer. This generates an unwanted second virtual image, the so-called "ghost image" or "ghost". It is advisable to take measures to prevent or at least to reduce the occurrence of the ghost image. To this end, two embodiments are proposed in the context of the invention.

In a first advantageous embodiment, a so-called "wedge film" is used as a thermoplastic intermediate layer. The thickness of the intermediate layer is variable over its vertical course between the lower edge and the upper edge of the composite pane at least in the HUD region, in particular increasing monotonically. The thickness can also vary in the entire vertical course, in particular can increase monotonically starting from the lower edge to the upper edge. "Vertical course" is the course between the lower edge and the upper edge with the direction of the course substantially perpendicular to said edges. The angle between the two surfaces of the intermediate layer is referred to as a "wedge angle". If the wedge angle is not constant, the tangents to the surface at one point must be used for its measurement. The wedge angle is preferably from 0.2 mrad to 1 mrad, particularly preferably from 0.3 mrad to 0.7 mrad, most particularly preferably from 0.4 mrad to 0.5 mrad. Due to the wedge angle of the intermediate layer, the non-parallel outer pane and inner pane enclose precisely that wedge angle. In the case of parallel pane surfaces, the image (generated by reflection of the s-polarised light component at the interior-side surface of the inner pane) and the ghost image (generated by reflection of the s-polarised light component at the exterior-side surface of the outer pane) would appear offset relative to one another, which is disturbing for the viewer. Due to the wedge angle, the ghost image is substantially superimposed spatially with the image such that the viewer only perceives a single image or the distance between the image on the ghost image is at least reduced.

At least in the HUD region, the intermediate layer is wedge-shaped or wedge-like, with the wedge angle suitably selected to superimpose the projection images that are caused by the reflections at the interior-side surface of the inner pane and at the exterior-side surface of the outer pane, or at least to reduce the distance between them.

The wedge angle of the intermediate layer can be constant over its vertical course, resulting in a linear variation in thickness of the intermediate layer, with the thickness typically becoming greater from the bottom upward. The directional indication "from the bottom upward" refers to the direction from the lower edge to the upper edge, i.e, the vertical course. However, there can be more complex thickness profiles, in which the wedge angle is variable, linearly or non-linearly, from the bottom upward (in other words, dependent on position over its vertical course).

In principle, instead of a wedge film in the intermediate layer, a wedge-like inner pane or outer pane can also be used to angle the reflective surfaces relative to one another.

In a second advantageous embodiment, an anti-reflective coating is applied on the interior-side surface of the inner pane. This suppresses the HUD image that would be generated by reflection of the interior-side surface of the inner pane. The (s-polarised) HUD image is generated only by the reflection at the exterior-side surface of the outer pane and no ghost image or only a noticeably reduced intensity ghost image occurs.

The anti-reflective coating is preferably a layer sequence with alternatingly high and low refractive index which leads, due to interference effects, to a reduction of the reflection at the coated surface. Such anti-reflective coatings are known per se.

The presence of the anti-reflective coating affects the reflection behaviour of the composite pane. The anti-reflective coating is preferably adjusted, in particular by suitable selection of materials and layer thicknesses such that the composite pane with the electrically conductive coating and the anti-reflective coating satisfies the requirements according to the invention for reflection behaviour, i.e., in particular, in the spectral range from 400 nm to 650 nm, has only a single local reflection maximum for p-polarised light, which is in the range from 510 nm to 550 nm. The above described preferred embodiments apply accordingly:

The anti-reflective coating can be implemented in various ways, and the invention is not restricted to a specific layer sequence. The anti-reflective coating preferably includes, starting from the substrate, a high refractive layer with a refractive index greater than 1.8, above it a low refractive layer with a refractive index smaller than 1.8, above it another high refractive layer with a refractive index greater than 1.8, and above it another low refractive layer with a refractive index smaller than 1.8.

In a particularly preferred embodiment, with which good results are achieved, the anti-reflective coating includes the following layers starting from the substrate (i.e., the interior-side surface of the inner pane):

a layer (high refractive layer) based on silicon nitride, tin-zinc oxide, silicon-zirconium nitride, or titanium oxide, preferably silicon nitride, with a thickness from 15 nm to 25 nm, preferably from 18 nm to 22 nm, a layer (low refractive layer) based on silicon dioxide with a thickness from 15 nm to 25 nm, preferably from 18 nm to 22 nm, a layer (high refractive layer) based on silicon nitride, tin-zinc oxide, silicon-zirconium nitride, or titanium oxide, preferably silicon nitride, with a thickness from 90 nm to 110 nm, preferably from 95 nm to 105 nm, a layer (low refractive layer) based on silicon dioxide with a thickness from 80 nm to 100 nm, preferably from 85 nm to 95 nm.

In the second advantageous embodiment as well, the intermediate layer can be wedge-shaped, for example, to superimpose the s-polarised image (from the reflection at the exterior-side surface of the outer pane) and the p-polarised image (from the reflection at the conductive coating) and thus to reduce the occurrence of a layer ghost image for drivers without polarisation-selective sunglasses. The intermediate layer is then, at least in the HUD region, wedge-shaped or wedge-like, with the wedge angle suitably selected to superimpose the projection images that are caused by the reflections at the electrically conductive coating and at the exterior-side surface of the outer pane, or at least to reduce the distance between them.

Due to the smaller distance between the reflection planes, the distance between the primary image and the ghost image in the case of a layer ghost image is smaller than with a ghost image generated by the pane surfaces, as a result of which the layer ghost image is less disturbing. Consequently, it is possible to use an intermediate layer, whose thickness is substantially constant in the vertical course between the upper edge and the lower edge. Such a non-wedge-shaped intermediate layer is preferred, because it is significantly more economical, as result of which the pane can be produced more economically. The conspicuousness of the layer ghost image is within acceptable limits in the case of typical composite panes such that no measures need be taken to avoid it.

The outer pane and the inner pane are preferably made of glass, in particular of soda lime glass, which is customary for window panes. In principle, however, the pane can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and/or the thermoplastic intermediate layer can be clear and colourless, but also tinted or coloured. In a preferred embodiment, the total transmittance through the windshield is greater than 70%. The term "total transmittance" is based on the process for testing the light permeability of motor vehicle windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing.

The composite pane is preferably curved in one or a plurality of spatial directions, as is customary for motor vehicle window panes, wherein typical radii of curvature are in the range from approx. 10 cm to approx. 40 m. The composite pane can, however, also be flat, for example, when it is intended as a pane for buses, trains, or tractors.

The thermoplastic intermediate layer contains at least a thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm. When a wedge-shaped layer is used, the thickness is determined at the thinnest point, typically at the lower edge of the composite pane.

The composite pane can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The electrically conductive coating is preferably applied by physical vapour deposition (PVD) onto the inner pane, particularly preferably by cathodic sputtering ("sputtering"), most particularly preferably by magnetron-enhanced cathodic sputtering. The same applies to the anti-reflective coating, if there is one. The coating or coatings are preferably applied on the panes before lamination. Instead of applying the electrically conductive coating on a pane surface, it can, in principle also be provided on a carrier film that is arranged in the intermediate layer.

If the composite pane is to be curved, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C.

The invention also includes the use of a composite pane implemented according to the invention as a projection surface of a projection arrangement for a head-up display, wherein a projector, whose light has at least one p-polarised portion, is aimed at the HUD region. The above-described preferred embodiments apply accordingly to the use. The projection arrangement is preferably used as an HUD in a motor vehicle, in particular a passenger car or a truck.

In the following, the invention is explained in detail with reference to drawings and exemplary embodiments. The drawings are schematic representations and are not true to scale. The drawings in no way restrict the invention.

Figure 2:
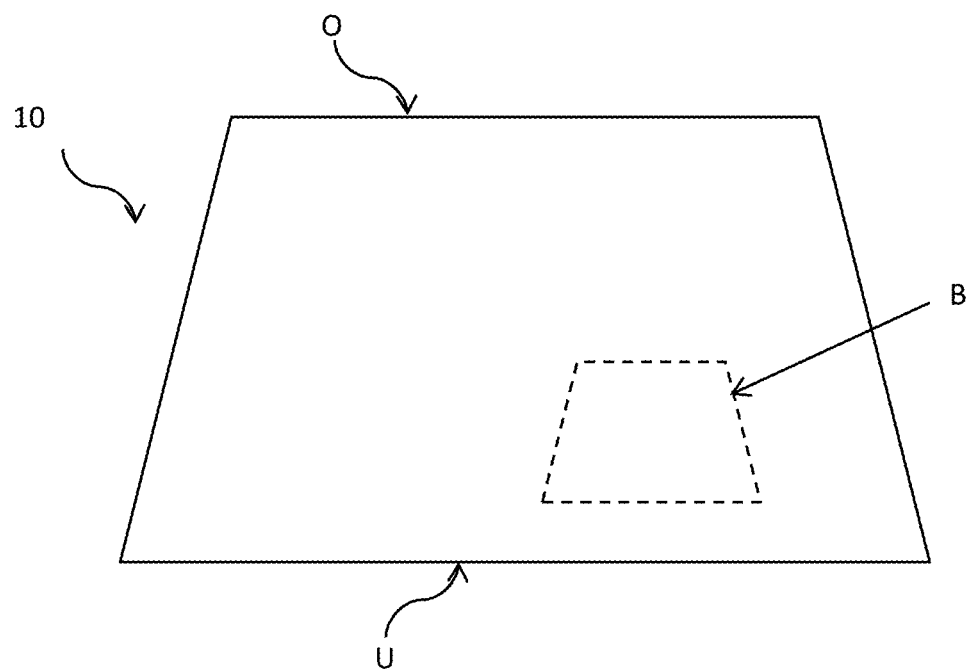
Figure 3:
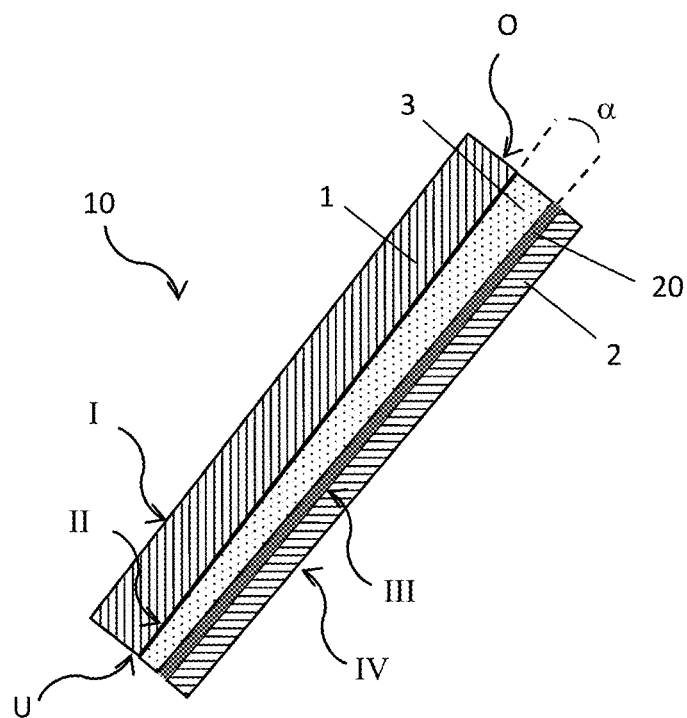
Figure 4:
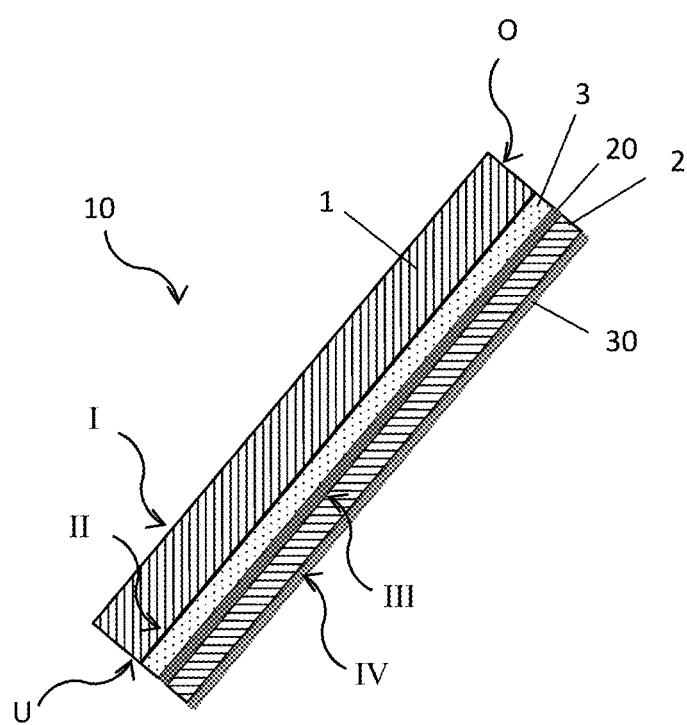
Figure 5:
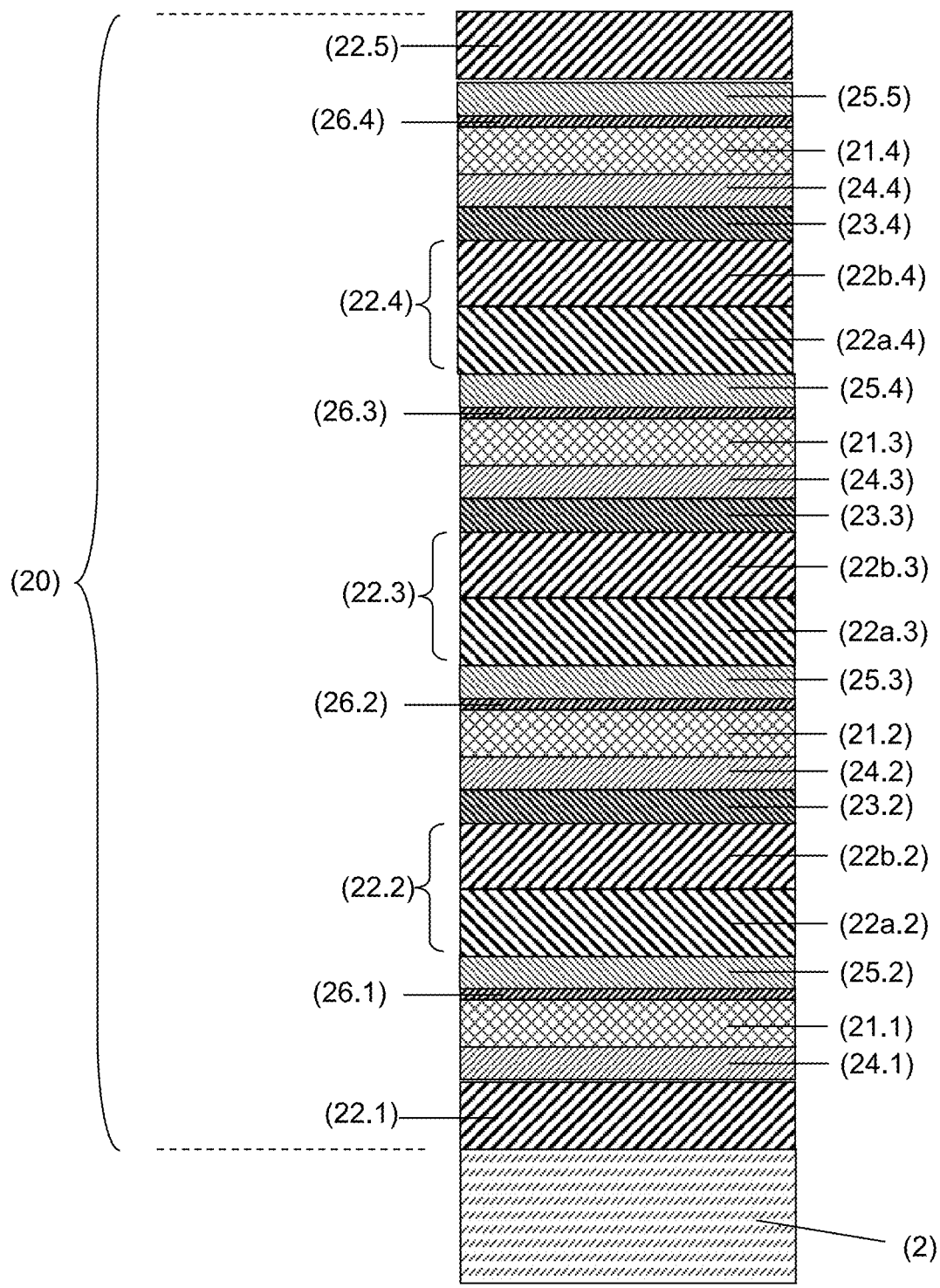
Figure 6:
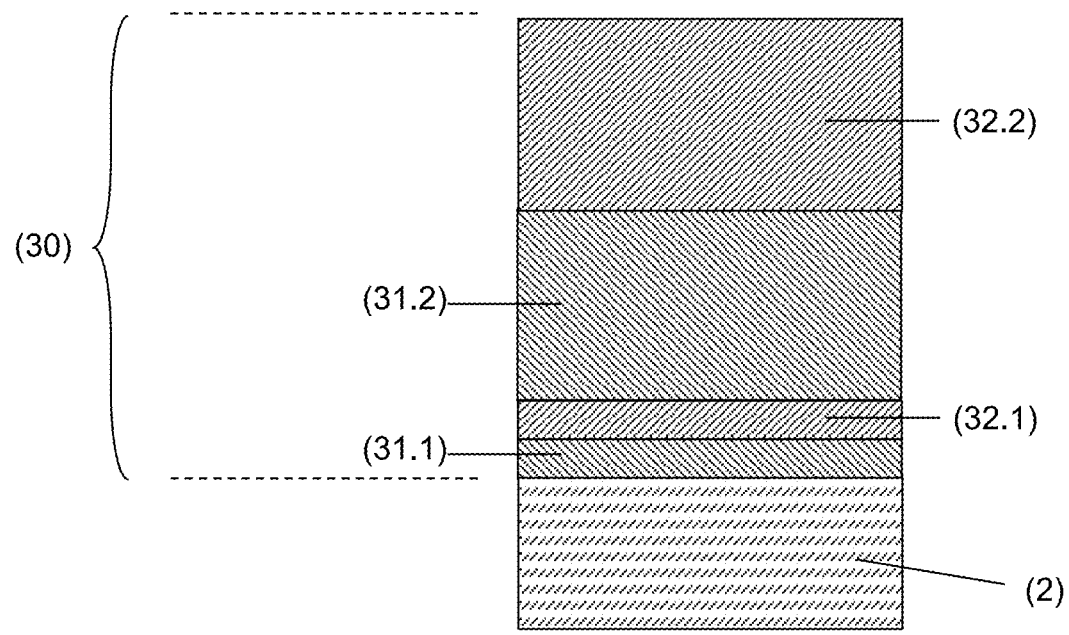
Figure 7:
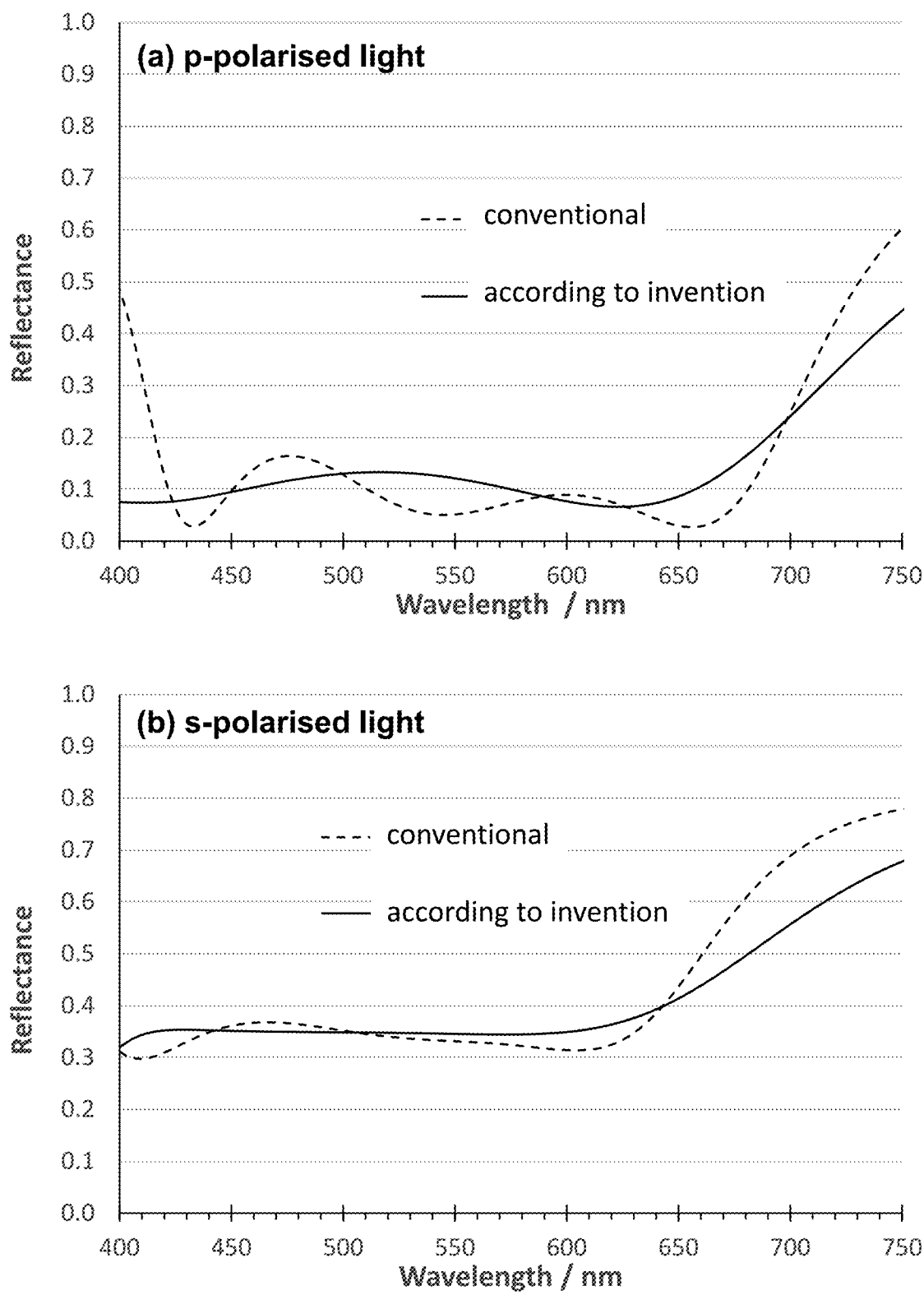

They Depict:

FIG. 1 a cross-section through a composite pane as part of a generic projection arrangement, FIG. 2 a plan view of the composite pane of FIG. 1, FIG. 3 a cross-section through a first embodiment of the composite pane according to the invention, FIG. 4 a cross-section through a second embodiment of the composite pane according to the invention, FIG. 5 a cross-section through an electrically conductive coating according to the invention, FIG. 6 a cross-section through an anti-reflective coating according to the invention, FIG. 7 reflection spectra of a composite pane with an electrically conductive coating according to the invention and a composite pane with a prior art electrically conductive coating.

FIG. 1 depicts a generic projection arrangement for an HUD. The projection arrangement comprises a composite pane 10, in particular the windshield of a passenger car. The projection arrangement also comprises a projector 4 that is aimed at a region B of the composite pane 10. In the region B, usually referred to as the HUD region, the projector 4 can generate images that are perceived by a viewer 5 (vehicle driver) as virtual images on the side of the composite pane 10 facing away from him if his eyes are situated within the so-called eye box E.

The composite pane 10 is constructed from an outer pane 1 and an inner pane 2 that are joined to one another via a thermoplastic intermediate layer 3. Its lower edge U is arranged downward in the direction of the engine of the passenger car; its upper edge O upward in the direction of the roof. The composite pane 10 also includes an electrically conductive coating (not shown), which is, for example, provided as an IR-reflective coating or as a heatable coating in. In the installed position, the outer pane 1 faces the outside environment; the inner pane 2, the vehicle interior.

The light of the projector 4 comprises a mixture of s-polarised and p-polarised components. Since the projector 4 irradiates the composite pane 10 with an angle of incidence of about 65°, which is close to Brewster's angle, the s-polarised light components are predominately reflected by the surfaces of the composite pane 10. The electrically conductive coating according to the invention is, on the other hand, optimized for the reflection of the p-polarised light components. A viewer 5 with polarisation-selective sunglasses that allow only p-polarised light to pass can, consequently, perceive the HUD projection. With prior art projection arrangements that operate only with s-polarised light, this is not the case. A viewer 5 without sunglasses sees the sum of s-polarised and p-polarised light such that the intensity of the HUD projection is not reduced for him. These are major advantages of the invention.

FIG. 2 depicts a plan view of the composite pane 10 of FIG. 1. The upper edge O, the lower edge U, and the HUD region B are discernible.

FIG. 3 depicts a first embodiment of a composite pane 10 implemented according to the invention. The outer pane 1 has an exterior-side surface I that faces the outside environment in the installed position and an interior-side surface II that faces the interior in the installed position. Likewise, the inner pane 2 has an exterior-side surface III that faces the outside environment in the installed position and an interior-side surface IV that faces the interior in the installed position. The outer pane 1 and the inner pane 2 are made, for example, of soda lime glass. The outer pane 1 has, for example, a thickness of 2.1 mm; the inner pane 2, a thickness of 1.6 mm. The intermediate layer 3 is made, for example, of a PVB film with a thickness of 0.76 mm The exterior-side surface III of the inner pane 2 is provided with the electrically conductive coating 20 according to the invention.

The s-polarised light components of the projector 4 are in each case partially reflected at the interior-side surface of the inner pane 1 (primary reflection) and the exterior-side surface of the outer pane 1 (secondary reflection). No appreciable refractive index transition occurs at the boundary surfaces between the panes 1, 2 and the intermediate layer 3 such that they do not form any reflection surfaces. In a prior art composite pane 10 with parallel surfaces, the two reflections result in two HUD projections offset relative to one another (a primary image and a so-called "ghost image"), which is disturbing for the viewer 5. To avoid or to at least reduce this, the intermediate layer 3 is wedge-shaped. The thickness of the intermediate layer 3 increases continuously over its vertical course from the lower edge U to the upper edge O. For the sake of simplicity, in the figure, the increase in thickness is depicted linearly, but can also have more complex profiles. The wedge angle α describes the angle between the two surfaces of the intermediate layer and is, for example, about 0.5 mrad. Due to the wedge-like intermediate layer, which results in an angled arrangement of the two reflection surfaces I, IV, the primary image and the ghost image are ideally superimposed exactly, but, at least the distance between them is reduced.

FIG. 4 depicts a further embodiment of a composite pane 10 implemented according to the invention. The outer pane 1 and the inner pane 2 are designed the same as in FIG. 3. Here, as well, the electrically conductive coating 20 is applied on the exterior-side surface III of the inner pane 2. Here, the intermediate layer 3 is is not wedge-shaped, but has the form of a standard film with a constant thickness of, for example, 0.76 mm. The ghost image problem is solved here in a different way: the interior-side surface IV of the inner pane 2 is is provided with an anti-reflective coating 30. This suppresses the reflection at the surface IV such that the s-polarised light components are reflected only at the exterior-side surface I of the outer pane. The anti-reflective coating 30 according to the invention is adjusted such that it does not substantially shift the reflection spectrum of the composite pane 10 for p-polarised light such that the properties according to the invention with regard to p-polarised light are still retained.

In both embodiments, a viewer 5 without polarisation-selective sunglasses will perceive, in addition to the HUD projection generated at the exterior-side surface I (s-polarised), a so-called "layer ghost image" (p-polarised) that is generated by the electrically conductive coating 20. The distance between the two reflection planes is sufficiently small with customary pane thicknesses for the layer ghost image to be within acceptable limits. The distance between the two projections could be reduced even further if the electrically conductive coating 20 were applied on the interior-side surface of the outer pane II and/or a thinner outer pane 1 and/or a thinner intermediate layer 3 were used.

FIG. 5 depicts the layer thickness of an electrically conductive coating 20 according to the invention. The coating 20 contains four electrically conductive layers 21 (21.1, 21.2, 21.3, 21.4). Each electrically conductive layer 21 is in each case arranged between two of a total of five anti-reflective layers 22 (22.1, 22.2, 22.3, 22.4, 22.5). The anti-reflective layers 22.2, 22.3, 22.4 that are arranged between two electrically conductive layers 21, are in each case subdivided into a dielectric layer 22a (22a.2, 22a.3, 22a.4) and an optically high refractive layer 22b (22b.2, 22b.3, 22b.4). The coating 20 also contains three smoothing layers 23 (23.2, 23.3, 23.4), four first matching layers 24 (24.1, 24.2, 24.3, 24.4), four second matching layers 25 (25.2, 25.3, 25.4, 25.5), and for blocking layers 26 (26.1, 26.2, 26.3, 26.4).

The layer sequence can be seen schematically in the figure. The layer sequence of a composite pane 10 with the coating 20 on the exterior-side surface III of the inner pane 2 is also presented, together with the materials and layer thicknesses of the individual layers, in Table 1 (Example). Table 1 also depicts the layer sequence of an electrically conductive coating, as it is currently already in use (Comparative Example). It can be seen that the reflection properties of the coating 20 according to the invention were achieved by suitable optimisation of the layer thicknesses of the individual layers.

FIG. 6 depicts the layer sequence of an anti-reflective coating 30 in the context of the invention, comprising two high refractive layers 31 (31.1, 31.2) and two low refractive layers 32 (32.1, 32.2). The layer sequence can be seen schematically in the figure. The layer sequence of a composite pane 10 with the electrically conductive coating 20 on the exterior-side surface III of the inner pane 2 and the anti-reflective coating 30 on the interior-side surface IV of the inner pane 2 is also shown in Table 2, together with the materials and layer thicknesses of the individual layers.

TABLE 1

| Material | Reference Character | | Layer Thickness | |
|---|---|---|---|---|
| | | | Example | Comparative Example |
| Glass | 1 | | 2.1 mm | 2.1 mm |
| PVB | 3 | | 0.76 mm | 0.76 mm |
| SiZrN | 20 | 22.5 | 12.3 nm | 25.2 nm |
| ZnO | | 25.5 | 10.0 nm | 10.0 nm |
| NiCr | | 26.4 | 0.2 nm | 0.2 nm |
| Ag | | 21.4 | 5.3 nm | 14.1 nm |
| ZnO | | 24.4 | 10.0 nm | 10.0 nm |
| SnZnO:Sb | | 23.4 | 7.0 nm | 7.0 nm |
| SiZrN | 22b.4 | 22.4 | 15.0 | 22.9 nm |
| SiN | 22a.4 | | 5.2 nm | 29.8 nm |
| ZnO | | 25.4 | 10.0 nm | 10.0 nm |
| NiCr | | 26.3 | 0.2 nm | 0.2 nm |
| Ag | | 21.3 | 9.6 nm | 14.2 nm |
| ZnO | | 24.3 | 10.0 nm | 10.0 nm |
| SnZnO:Sb | | 23.3 | 7.0 nm | 7.0 nm |
| SiZrN | 22b.3 | 22.3 | 15.0 nm | 20.1 nm |
| SiN | 22a.3 | | 35.1 nm | 29.6 nm |
| ZnO | | 25.3 | 10.0 nm | 10.0 nm |
| NiCr | | 26.2 | 0.2 nm | 0.2 nm |
| Ag | | 21.2 | 12.4 nm | 17.1 nm |
| ZnO | | 24.2 | 10.0 nm | 10.0 nm |
| SnZnO:Sb | | 23.2 | 7.0 nm | 7.0 nm |
| SiZrN | 22b.2 | 22.2 | 15.0 nm | 19.4 nm |

TABLE 1-continued

| Material | Reference Character | Layer Thickness Example | Layer Thickness Comparative Example |
|---|---|---|---|
| SiN | 22a.2 | 15.5 nm | 34.1 nm |
| ZnO | 25.2 | 10.0 nm | 10.0 nm |
| NiCr | 26.1 | 0.2 nm | 0.2 nm |
| Ag | 21.1 | 9.5 nm | 11.7 nm |
| ZnO | 24.1 | 10.0 nm | 10.0 nm |
| SiN | 22.1 | 21.2 nm | 28.8 nm |
| Glass | 2 | 1.6 mm | 1.6 nm |

TABLE 2

| Material | Reference Character | Layer Thickness |
|---|---|---|
| SiO | 30 32.2 | 92.7 nm |
| SiN | 31.2 | 102.2 nm |
| SiO | 32.1 | 20.5 nm |
| SiN | 31.1 | 19.9 nm |
| Glass | 2 | 1.6 mm |
| | 20 | (See Table 1) |
| PVB | 3 | 0.76 mm |
| Glass | 1 | 2.1 mm |

FIG. 7 depicts the reflection spectrum of a composite pane 10 with a prior art conductive coating 20 per the Comparative Example and a conductive coating 20 according to the invention per the Example (cf. Table 1) for p-polarised light (Part a) and for s-polarised light (Part b). The spectra were measured on the interior-side at an angle of incidence of 65°, thus simulating the reflection behaviour for the HUD projector.

The prior art coating per the Comparative Example, as it has been used to date, has, in the spectral range from 400 nm to 650 nm for p-polarised light, two local reflection maxima: at 476 nm and at 600 nm. The difference between the reflectance of the local reflection maximum and the minimally occurring reflectance for p-polarised light in the spectral range from 400 nm to 650 nm is significantly more than 10%.

In contrast, the coating according to the invention per the Example has, in the spectral range from 400 nm to 650 nm for p-polarised light, only a single local reflection maximum. The local reflection maximum is situated at 516 nm, i.e., in the green spectral range, for which the human eye is particularly sensitive. The difference between the reflectance of the local reflection maximum and the minimally occurring reflectance for p-polarised light in the spectral range from 400 nm to 650 nm is only 6.7%.

For s-polarised light as well, the reflection spectrum of the coating according to the invention is significantly flatter than that of the prior art coating in the spectral range from 450 nm to 600 nm. The difference between the maximally occurring reflectance and the mean is 0.4%; the difference between the minimally occurring reflectance and the mean is 0.3%.

By means of the embodiment of the coating according to the invention of the Example, an HUD image with neutral coloration is generated. In addition, the relative proportions of s-polarised and p-polarised light can be freely selected without being associated with a color shift or other undesirable effects. The light components are thus adjustable according to the requirements of the individual case, without imposing limits on the person skilled in the art due to the coating. A ratio can be set such that optimum intensity of the HUD projection is achieved for drivers with and without polarisation-selective sunglasses.

Table 3 presents the total reflectance with various polarisation proportions of the projector light, on the one hand, for a prior art composite pane (coating 20 as specified in Table 1 under Comparative Example, no anti-reflective coating 30), on the other, for a composite pane according to the invention (coating 20 as specified in Table 1 under Example, structure with anti-reflective coating 30 as specified in Table 2). It is clear to see that the reflectance for p-polarised light (perceived by a viewer with polarisation-selective sunglasses) is significantly increased at any polarisation ratio. The reflectance for s- and p-polarised light (perceived by a viewer without polarisation-selective sunglasses) is also increased starting at a p-polarisation proportion of 50%. Overall, a more intense image results.

TABLE 3

| Light Components of the Projector Light | | Comparative Example | | Example | |
|---|---|---|---|---|---|
| p | s | s + p | p | s + p | p |
| 0 | 100 | 33.1 | 0 | 26.4 | 0.0 |
| 10 | 90 | 30.5 | 0.7 | 25.4 | 1.6 |
| 20 | 80 | 27.9 | 1.4 | 24.4 | 3.3 |
| 30 | 70 | 25.3 | 2.1 | 23.4 | 4.9 |
| 40 | 60 | 22.7 | 2.8 | 22.4 | 6.6 |
| 50 | 50 | 20.1 | 3.5 | 21.4 | 8.2 |
| 60 | 40 | 17.4 | 4.2 | 20.4 | 9.8 |
| 70 | 30 | 14.8 | 4.9 | 19.4 | 11.5 |
| 80 | 20 | 12.2 | 5.6 | 18.4 | 13.1 |
| 90 | 10 | 9.6 | 6.3 | 17.4 | 14.8 |
| 100 | 0 | 7.0 | 7.0 | 16.4 | 16.4 |

LIST OF REFERENCE CHARACTERS

(10) composite pane
(1) outer pane
(2) inner pane
(3) thermoplastic intermediate layer
(4) projector
(5) viewer/vehicle driver
(20) electrically conductive coating
(21) electrically conductive layer
(21.1), (21.2), (21.3), (21.4) 1., 2., 3., 4. electrically conductive layer
(22) anti-reflective layer
(22.1), (22.2), (22.3), (22.4), (22.5) 1., 2., 3., 4., 5. anti-reflective layer
(22a) dielectric layer of the anti-reflective layer 4
(22a.2), (22a.3), (22a.4) 1., 2., 3. dielectric layer
(22b) optically high refractive layer of the anti-reflective layer 4
(22b.2), (22b.3), (22b.4) 1., 2., 3. optically high refractive layer
(23) smoothing layer
(23.2), (23.3), (23.4) 1., 2., 3. smoothing layer
(24) first matching layer
(24.1), (24.2), (24.3), (24.4) 1., 2., 3., 4. first matching layer
(25) second matching layer
(25.2), (25.3), (25.4), (25.5) 1., 2., 3., 4. second matching layer
(26) blocking layer
(26.1), (26.2), (26.3), (26.4) 1., 2., 3., 4. blocking layer
(30) anti-reflective coating
(31) high refractive layer of the anti-reflective coating 30

(31.1), (31.2) 1., 2. high refractive layer
(32) low refractive layer of the anti-reflective coating 30
(32.1), (32.2) 1., 2. low refractive layer
(O) upper edge of the composite pane 10
(U) lower edge of the composite pane 10
(B) HUD region of the composite pane 10
(E) eye box
(I) exterior-side surface of the outer pane 1, facing away from the intermediate layer 3,
(II) interior-side surface of the outer pane 1, facing the intermediate layer 3,
(III) exterior-side surface of the inner pane 2, facing the intermediate layer 3,
(IV) interior-side surface of the inner pane 2, facing away from the intermediate layer 3
α wedge angle

The invention claimed is:

1. A projection arrangement for a head-up display (HUD), comprising:
   a composite pane, comprising an outer pane and an inner pane, which are joined to one another via a thermoplastic intermediate layer, having an upper edge and a lower edge and an HUD region;
   an electrically conductive coating on a surface of the outer pane or the inner pane facing the intermediate layer or within the intermediate layer; and
   a projector that is aimed at the HUD region;
   wherein light of the projector has at least one p-polarised portion, wherein the proportion of p-polarised light in the total light of the projector is from 20% to 80%,
   wherein the electrically conductive coating has, in the spectral range from 400 nm to 650 nm, only a single local reflection maximum for p-polarised light, with said single local reflection maximum situated in the range from 510 nm to 550 nm,
   wherein the electrically conductive coating includes at least four electrically conductive layers, which are in each case arranged between two dielectric layers or layer sequences, wherein each dielectric layer sequence includes an anti-reflective layer, and wherein
   the anti-reflective layer below the first electrically conductive layer has a thickness from 15 nm to 25 nm,
   the anti-reflective layer between the first and the second electrically conductive layer has a thickness from 25 to 35 nm,
   the anti-reflective layer between the second and the third electrically conductive layer has a thickness from 45 nm to 55 nm,
   the anti-reflective layer between the third and the fourth electrically conductive layer has a thickness from 15 nm to 25 nm, and
   the anti-reflective layer above the fourth electrically conductive layer has a thickness from 8 nm to 18 nm.

2. The projection arrangement according to claim 1, wherein in the spectral range from 400 nm to 650 nm, a difference between the reflectance of the local reflection maximum and a minimally occurring reflectance for p-polarised light is at most 10%.

3. The projection arrangement according to claim 1, wherein the reflectance for s-polarised light in the spectral range from 450 nm to 600 nm is substantially constant such that a difference between the maximally occurring reflectance and a mean as well as a difference between the minimally occurring reflectance and the mean are at most 5%.

4. The projection arrangement according to claim 1, wherein the proportion of p-polarised light in the total light of the projector is from 50% to 80%.

5. The projection arrangement according to claim 1, wherein the electrically conductive layers are based on silver and have, in each case, a layer thickness from 5 to 15 nm, wherein a total layer thickness of all electrically conductive layers is from 20 nm to 50 nm.

6. The projection arrangement according to claim 1, wherein all anti-reflective layers that are arranged between two electrically conductive layers are divided into a dielectric layer having a refractive index smaller than 2.1, and an optically high refractive layer having a refractive index greater than or equal to 2.1.

7. The projection arrangement according to claim 1, wherein a thickness of the intermediate layer is variable with a wedge angle in its vertical course between the upper edge and the lower edge at least in the HUD region.

8. The projection arrangement according to claim 1, wherein an anti-reflective coating is applied on the surface of the inner pane facing away from the intermediate layer.

9. The projection arrangement according to claim 8, wherein a thickness of the intermediate layer is substantially constant in the vertical course between the upper edge and the lower edge.

10. The projection arrangement according to claim 8, wherein the thickness of the intermediate layer is variable with a wedge angle in its vertical course between the upper edge and the lower edge at least in the HUD region.

11. The projection arrangement according to claim 1, wherein the light of the projector strikes the composite pane with an angle of incidence from 60° to 70°.

12. The projection arrangement according to claim 2, wherein the difference between the reflectance of the local reflection maximum and the minimally occurring reflectance for p-polarised light is at most 8%.

13. The projection arrangement according to claim 3, wherein the difference between the maximally occurring reflectance and the mean as well as the difference between the minimally occurring reflectance and the mean are at most 1%.

14. The projection arrangement according to claim 6, wherein the dielectric layer is based on silicon nitride and the optically high refractive layer is based on a mixed silicon/metal nitride.

15. The projection arrangement according to claim 14, wherein the optically high refractive layer is layer of silicon-zirconium nitride or silicon-hafnium nitride.

16. The projection arrangement according to claim 7, wherein the wedge angle is selected for superimposing the reflections at the interior-side surface of the inner pane and at the exterior-side surface of the outer pane or for at least reducing the distance between them.

17. The projection arrangement according to claim 10, wherein the wedge angle is selected for superimposing the reflections at the electrically conductive coating and at the exterior-side surface of the outer pane or for at least reducing the distance between them.

18. A projection arrangement for a head-up display (HUD), comprising:
   a composite pane, comprising an outer pane and an inner pane, which are joined to one another via a thermoplastic intermediate layer, having an upper edge and a lower edge and an HUD region;
   an electrically conductive coating on a surface of the outer pane or the inner pane facing the intermediate layer or within the intermediate layer; and a projector that is aimed at the HUD region;

wherein light of the projector has at least one p-polarised portion, wherein the proportion of p-polarised light in the total light of the projector is from 20% to 80%, and wherein the electrically conductive coating has, in the spectral range from 400 nm to 650 nm, only a single local reflection maximum for p-polarised light, with said single local reflection maximum situated in the range from 510 nm to 550 nm, wherein an anti-reflective coating is applied on the surface of the inner pane facing away from the intermediate layer, and wherein the anti-reflective coating includes the following layers, starting from the inner pane:

a high refractive layer based on silicon nitride with a thickness from 15 nm to 25 nm, a low refractive layer based on silicon dioxide with a thickness from 15 nm to 25 nm, a high refractive layer based on silicon nitride with a thickness from 90 nm to 110 nm, a low refractive layer based on silicon dioxide with a thickness from 80 nm to 100 nm.

19. The projection arrangement according to claim 18, wherein the electrically conductive coating includes at least four electrically conductive layers, which are in each case arranged between two dielectric layers or layer sequences.

20. A method comprising utilizing a composite pane, comprising an outer pane and an inner pane, which are joined to one another via a thermoplastic intermediate layer, having an upper edge and a lower edge and an HUD region and having an electrically conductive coating on a surface of the outer pane or the inner pane facing the intermediate layer or provided within the intermediate layer, as a projection surface of a projection arrangement for a head-up display (HUD), wherein a projector is aimed at the HUD region, whose light has at least one p-polarised portion, wherein the proportion of p-polarised light in the total light of the projector is from 20% to 80%, and wherein the electrically conductive coating has, in the spectral range from 400 nm to 650 nm, only a single local reflection maximum for p-polarised light, with said single local reflection maximum situated in the range from 510 nm to 550 nm, wherein the electrically conductive coating includes at least four electrically conductive layers, which are in each case arranged between two dielectric layers or layer sequences, wherein each dielectric layer sequence includes an anti-reflective layer, and wherein the anti-reflective layer below the first electrically conductive layer has a thickness from 15 nm to 25 nm, the anti-reflective layer between the first and the second electrically conductive layer has a thickness from 25 to 35 nm, the anti-reflective layer between the second and the third electrically conductive layer has a thickness from 45 nm to 55 nm, the anti-reflective layer between the third and the fourth electrically conductive layer has a thickness from 15 nm to 25 nm, and the anti-reflective layer above the fourth electrically conductive layer has a thickness from 8 nm to 18 nm.

\* \* \* \* \*